(12) United States Patent
Shin et al.

(10) Patent No.: US 10,335,949 B2
(45) Date of Patent: Jul. 2, 2019

(54) SYSTEM FOR OPERATING MOBILE ROBOT BASED ON COMPLEX MAP INFORMATION AND OPERATING METHOD THEREOF

(71) Applicant: YUJIN ROBOT CO., LTD., Seoul (KR)

(72) Inventors: Kyung Chul Shin, Seoul (KR); Seong Ju Park, Gunpo-si (KR); Yeong il Choe, Incheon (KR); Jae Young Lee, Gunpo-si (KR); Byung Kwon Moon, Seoul (KR); Myung Kyo Jeong, Anyang-si (KR)

(*) Notice: Subject to any disclaimer, the term of this patent is extended or adjusted under 35 U.S.C. 154(b) by 38 days.

(21) Appl. No.: 15/410,763

(22) Filed: Jan. 19, 2017

(65) Prior Publication Data
US 2017/0203439 A1   Jul. 20, 2017

(30) Foreign Application Priority Data

Jan. 20, 2016  (KR) .................. 10-2016-0007244
Sep. 5, 2016   (KR) .................. 10-2016-0114021
Jan. 2, 2017   (KR) .................. 10-2017-0000350

(51) Int. Cl.
G05D 1/00   (2006.01)
B25J 9/16   (2006.01)
G05D 1/02   (2006.01)

(52) U.S. Cl.
CPC .......... *B25J 9/1689* (2013.01); *G05D 1/0219* (2013.01); *G05D 1/0274* (2013.01); *G05B 2219/40195* (2013.01); *G05B 2219/40305* (2013.01); *G05D 2201/0203* (2013.01)

(58) Field of Classification Search
USPC .................................................. 700/245–264
See application file for complete search history.

(56) References Cited

U.S. PATENT DOCUMENTS

| | | | | |
|---|---|---|---|---|
| 4,674,048 A * | 6/1987 | Okumura | ............... | B25J 9/1676 318/568.12 |
| 6,459,955 B1 * | 10/2002 | Bartsch | ............... | A47L 9/00 700/245 |
| 9,223,749 B2 * | 12/2015 | Chiappetta | ............... | G05D 1/0225 |
| 9,420,741 B2 * | 8/2016 | Balutis | ............... | G05D 1/0265 |
| 2002/0193908 A1 * | 12/2002 | Parker | ............... | G06N 3/008 700/258 |
| 2004/0083570 A1 * | 5/2004 | Song | ............... | A47L 9/009 15/319 |
| 2004/0204792 A1 * | 10/2004 | Taylor | ............... | A47L 9/2805 700/245 |

(Continued)

*Primary Examiner* — Jonathan L Sample
(74) *Attorney, Agent, or Firm* — Jongkook Park

(57) ABSTRACT

Disclosed are a system for operating a mobile robot based on cleaning area information and a method thereof. A mobile robot based on cleaning area information according to an exemplary embodiment of the present invention includes a memory which stores a plurality of cleaning area information in which at least a part of a cleaning available area is changed; and a controller which controls to select one cleaning area information among the plurality of stored cleaning area information, recognize a position on a cleaning area map which configures the selected cleaning area information and perform cleaning on the cleaning available area from the recognized position.

11 Claims, 18 Drawing Sheets

(56) References Cited

U.S. PATENT DOCUMENTS

| | | | |
|---|---|---|---|
| 2005/0156562 A1* | 7/2005 | Cohen | A47L 9/2857 320/107 |
| 2005/0192707 A1* | 9/2005 | Park | A47L 9/281 700/259 |
| 2005/0251292 A1* | 11/2005 | Casey | G05D 1/0238 700/245 |
| 2006/0085105 A1* | 4/2006 | Chiu | H02J 7/0044 701/23 |
| 2006/0190133 A1* | 8/2006 | Konandreas | A22C 17/0013 700/245 |
| 2006/0190146 A1* | 8/2006 | Morse | A47L 5/14 701/23 |
| 2007/0016328 A1* | 1/2007 | Ziegler | A47L 5/14 700/245 |
| 2007/0192910 A1* | 8/2007 | Vu | B25J 5/007 700/245 |
| 2007/0213892 A1* | 9/2007 | Jones | A47L 11/00 701/23 |
| 2008/0015738 A1* | 1/2008 | Casey | G05D 1/0238 700/258 |
| 2008/0161969 A1* | 7/2008 | Lee | G05D 1/0225 700/245 |
| 2008/0184518 A1* | 8/2008 | Taylor | A47L 9/009 15/319 |
| 2010/0263142 A1* | 10/2010 | Jones | G05D 1/0219 15/21.1 |
| 2011/0202175 A1* | 8/2011 | Romanov | A47L 11/4011 700/250 |
| 2012/0169497 A1* | 7/2012 | Schnittman | A47L 9/106 340/540 |
| 2013/0030750 A1* | 1/2013 | Kim | G06N 3/004 702/108 |
| 2013/0204463 A1* | 8/2013 | Chiappetta | G05D 1/0225 701/2 |
| 2013/0221917 A1* | 8/2013 | Kulkarni | B60L 11/1825 320/109 |
| 2013/0226344 A1* | 8/2013 | Wong | G05D 1/024 700/258 |
| 2014/0129027 A1* | 5/2014 | Schnittman | G05D 1/0219 700/253 |
| 2014/0207280 A1* | 7/2014 | Duffley | G05D 1/0016 700/257 |
| 2014/0207282 A1* | 7/2014 | Angle | H04L 12/282 700/257 |
| 2014/0222197 A1* | 8/2014 | Letsky | A01D 34/008 700/245 |
| 2014/0288709 A1* | 9/2014 | Sim | G05D 1/0225 700/259 |
| 2016/0027207 A1* | 1/2016 | Hillen | G06T 17/00 348/207.1 |
| 2016/0144505 A1* | 5/2016 | Fong | B25J 9/1602 700/250 |
| 2017/0329347 A1* | 11/2017 | Passot | A47L 11/4011 |
| 2018/0304463 A1* | 10/2018 | Wolowelsky | B25J 5/00 |

* cited by examiner

SYSTEM FOR OPERATING MOBILE ROBOT BASED ON COMPLEX MAP INFORMATION AND OPERATING METHOD THEREOF

CROSS-REFERENCE TO RELATED APPLICATIONS

This application claims priority to and the benefit of Korean Patent Application No. 10-2016-0007244 filed in the Korean Intellectual Property Office on Jan. 20, 2016, Korean Patent Application No. 10-2016-0114021 filed in the Korean Intellectual Property Office on Sep. 5, 2016, and Korean Patent Application No. 10-2017-0000350 filed in the Korean Intellectual Property Office on Jan. 2, 2017, the entire contents of which are incorporated herein by reference.

TECHNICAL FIELD

The present invention relates to a mobile robot, and more particularly, to a system for operation of a mobile robot using a composite of plurality of different types of cleaning area information according to the operation environment, and a method thereof.

BACKGROUND ART

Initial cleaning robots performed random cleaning while traveling by themselves, and there were areas wherein cleaning could not be performed due to the presence of obstacles and/or the condition of the floor surface.

In order to compensate for this, techniques have been developed to perform cleaning based on a map, and such map-based cleaning robots are operated in two main ways.

In the first method, the cleaning robot uses a map stored internally to perform cleaning and transmits the cleaning progress or completion status to a user terminal. In the second method, the cleaning robot provides the user with its internally stored map, and the user then uses the received map to transmit commands.

However, since the existing such map-based cleaning robots use only one map, inconvenience can be incurred because a new cleaning map needs to be created whenever the working environment changes in order to perform cleaning.

SUMMARY OF THE INVENTION

In order to solve the above-mentioned problems in the existing technology, the aim of the present invention is to provide a system for operation of a mobile robot which creates a composite of a plurality of different types of cleaning area information obtained from a cleaning area map representing the cleaning area, a feature point map for recognizing a position within the cleaning area, and option information set by a user in order to perform cleaning while recognizing the position through selective use of the composite of cleaning area information, and a method thereof.

However, the object of the present invention is not limited to the above description, and other objects, which have not been mentioned above, will be more apparent to those skilled in the art from a reading of the following description.

In order to achieve the above-mentioned aim, according to an aspect of the present invention, a mobile robot which moves based on a composite of map information may include: a memory which stores a plurality of composites of cleaning area information in which at least part of the available cleaning area is changed; and a controller which controls the selection of one composite of cleaning area information from among the plurality of stored composites of cleaning area information, recognizes its position on a cleaning area map which is constituted by the selected composite of cleaning area information, and performs cleaning of the available cleaning area from the recognized position.

Further, the above-mentioned composites of cleaning area information may include a cleaning area map representing the available cleaning area, a feature point map of feature point information for recognizing the position within the cleaning area map, and option information set by a user.

Further, the controller may obtain an image while moving from a first position to a second position in a preconfigured manner according to a control command from the user, extract feature points from the obtained image to construct a temporary feature point map using the extracted feature points, and compare the constructed temporary feature point map with each feature point map constituting the stored plurality of composites of cleaning area information to allow selection of the composite of cleaning area information constituted by the feature point map having the highest matching rate as a result.

Further, the controller may calculate odometry information using inertia information obtained according to the movement from the first position to the second position, predict the point of movement based on the calculated odometry information, and compare the temporary feature point information obtained at the predicted movement point with feature point information constituting the feature point map obtained from the movement point and the vicinity of the movement point, as a result determining the position within the cleaning area map of the composite of cleaning area information corresponding to the feature point information having the highest matching rate as the second position.

When the second position is determined, the controller may update the cleaning area map of the composite of cleaning area information to have the area where the cleaning robot moved from the first position to the second position as a completed area, and control the mobile robot to perform cleaning of the available cleaning area from the second position in the updated cleaning area map, and further update the performance results.

Further, the controller may extract preconfigured geometric information from the constructed temporary feature point information map and, based on the extracted geometric information, compare the temporary feature point map with the feature point maps constituting each of the stored plurality of composites of cleaning area information to select the cleaning area information constituting the feature point map which has the highest matching rate as a result.

When information for a wireless router is received from user equipment, the controller may wirelessly connect the mobile robot to the wireless router based on the received wireless router information.

Further, the controller may operate in a first mode to serve as a wireless router which may connect wirelessly to the user equipment, and when information for a wireless router is received from the user equipment, halt the first mode operation, after which it may operate in a second mode for connecting the user equipment to the wireless router based on the received wireless router information.

According to another aspect of the present invention, the system for operating a mobile robot may include: a wireless router which is deployed in the space where a mobile robot is located to connect wirelessly to the mobile robot; and user equipment which transmits control commands to the mobile robot through the wireless router and receives information on the area where cleaning has been completed as well as composite cleaning area information while the mobile robot performs cleaning, based on the previously stored cleaning area information.

Further, the user equipment may activate a mobile application through which information may be transmitted to the mobile robot regarding a wireless router to which the mobile robot is to be connected.

Further, the user equipment may transmit a control command to the mobile robot to be provided with the previously stored plurality of composites of cleaning area information from the mobile robot as a response thereof, and when one composite of cleaning area information is selected by the user from among the plurality of provided cleaning area information, may provide the selected result to the mobile robot.

According to yet another aspect of the present invention, the method for operating a mobile robot may include: selecting one composite of cleaning area information from among the previously stored plurality of composites of cleaning area information according to a control command from the user; recognizing the position within a cleaning area map constituted by the selected composite of cleaning area information; and while performing cleaning of the available cleaning area on the cleaning area map starting from the recognized position, updating the cleaning area map to include the area where cleaning has been completed as a result of the cleaning performance.

In the selecting, an image may be obtained while performing cleaning from a first position to a second position in a preconfigured manner according to the control command, feature points may be extracted from the obtained image to construct a temporary feature point map of the extracted feature points, and the constructed temporary feature point map may be compared with the feature point map constructed from each of the stored plurality of composites of cleaning area information to select the cleaning area information constituting the feature point map having the highest matching rate as a result.

In the recognizing, odometry information may be calculated using inertia information obtained according to the movement from the first position to the second position, a point of movement may be predicted based on the calculated odometry information, temporary feature point information obtained at the predicted movement point may be compared with feature point information constituting the feature point map obtained from the movement point and in the vicinity of the movement point, and as a result, the position within the cleaning area map of the cleaning area information corresponding to the feature point information having the highest matching rate may be determined as the second position.

In the updating, when the second position is determined, the cleaning area map of the composite cleaning area information may be updated to include an area where cleaning has been completed from the first position to the second position, and cleaning may be performed on the available cleaning area starting from the second position in the updated cleaning area map, after which the performance results are updated.

As described above, according to the present invention, it is possible to generate a plurality of composites of cleaning area information of a cleaning area map representing the cleaning area, a feature point map for recognizing the position within the cleaning area, and option information set by a user, and to perform cleaning while recognizing the position through selective use of the generated plurality of composites of cleaning area information, thereby minimizing user intervention due to change of the working environment.

Further, according to the present invention, when the mobile robot moves, the position in the cleaning area is recognized using the feature point information so that the difference between the actual position and the position on the map may be minimized.

Furthermore, according to the present invention, when the mobile robot moves, cleaning is performed even while performing the process of recognizing the position in the cleaning area, thus allowing increase of the cleaning efficiency while shortening the cleaning time.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
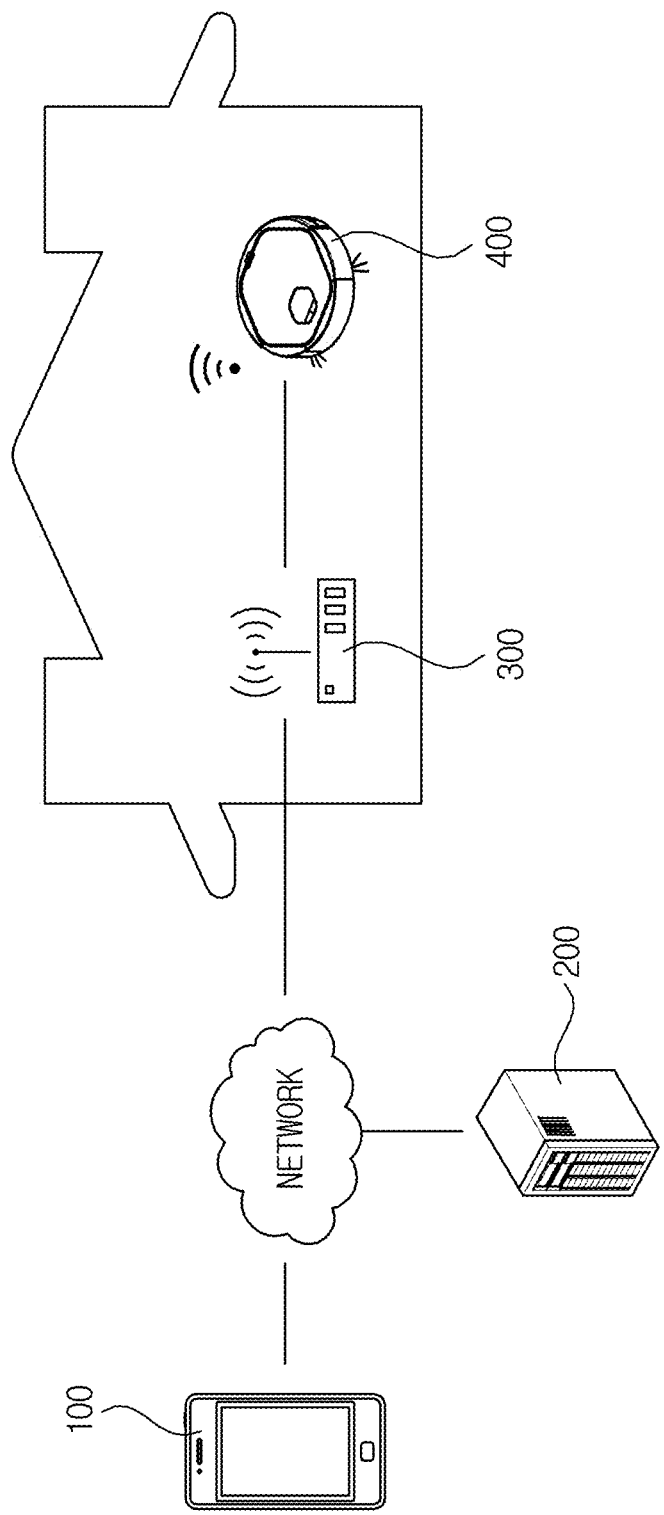
FIG. 1 is a diagram illustrating a schematic configuration of a cleaning environment and system, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter, a system for operating a mobile robot based on composite cleaning area information and a method thereof, according to an exemplary embodiment of the present invention, will be described with reference to accompanying drawings. Parts required to understand the operation and effects of the present invention will be mainly described in detail.

In the description of the components of an exemplary embodiment, a component having the same name may be denoted by a different reference numeral in some drawings but may be denoted by the same reference numeral in other drawings. However, even in this case, it does not mean that the component has different functions depending on the exemplary embodiment or that the components have the same function in the different exemplary embodiments, but rather the function of each of the components shall be determined based on the description of the components in the corresponding exemplary embodiment.

The present invention generates a plurality of composites of cleaning area information of a cleaning area map representing the cleaning area, a feature point map for recognizing the position in the cleaning area, and option information set by a user, and performs cleaning while recognizing the position through selective use of the generated plurality of composites of cleaning area information according to a user's command.

In the exemplary embodiment of the present invention, a "mobile robot" refers to a robot that may travel, whether autonomously or according to commands from a user. A mobile robot may include, for example, a cleaning robot, a logistics transport robot for transporting industrial logistics, a service robot for transporting personal objects, such as food, a military robot for serving a military purpose, or any other robot that may travel. Although exemplary embodiments of the present invention are described in connection with a cleaning robot, any other type of mobile robot may also utilize the various aspects of the present invention.

FIG. 1 is a diagram illustrating a schematic configuration of a cleaning environment and system according to an exemplary embodiment of the present invention.

As illustrated in FIG. 1, the system according to an exemplary embodiment of the present invention may include user equipment 100, a mediation server 200, a wireless router 300, and a mobile robot 400.

The user equipment 100 connects to the mobile robot 400 through a network and displays various information provided by the mobile robot 400 onto a screen, thus allowing a user to control the performance of various functions based on the information.

In this case, the user equipment 100 may allow a user to control the performance of various functions through a mobile application. Such functions include a remote control function, a video call function, a driving/cleaning control function, a map information checking function, a cleaning status checking function, a cleaning area setting function, and a cleaning schedule setting function.

1) The remote control function is a function of using the user equipment as a remote control for the mobile robot. In other words, the user equipment is used as an input/output device for controlling the mobile robot instead of controlling the mobile robot by direct contact with the mobile robot, which may not be practical.

2) The video call function is a function that allows a video call to be held with a person in the vicinity of the mobile robot using a camera, microphone, and speaker installed in the mobile robot.

3) The driving/cleaning control function is a function that moves the mobile robot or instructs it to clean.

4) The map information checking function is a function that transmits map information generated by the mobile robot, using, for example, a technique such as SLAM (simultaneous localization and mapping), to the user equipment to allow the user to view the map information.

5) The cleaning status checking function is a function in which the mobile robot, based on the map information, transmits, to the user equipment, indications of areas already cleaned by the mobile robot, areas that are in the process of being cleaned by the mobile robot, and areas that are to be cleaned by the mobile robot, thus allowing the user to check the status of a cleaning operation.

6) The cleaning area setting function is a function which allows the user to setup partial areas among the entire area where cleaning is possible, that is, to specify areas in which entrance is prohibited or areas for intensive cleaning, for example, based on the map information.

7) The cleaning schedule setting function is a function which allows the user to setup settings such as the days of the week for cleaning, and the cleaning time.

The user equipment 100 is electronic equipment that may perform wireless communications and facilitate the foregoing functions. For example, the user equipment 100 may be a mobile phone, a smart phone, a notebook/laptop computer, a digital broadcasting terminal, a personal digital assistant (PDA), a portable multimedia player (PMP), a navigation system, a netbook, or a tablet.

The mediation server 200 may connect to both the user equipment and the mobile robot to provide each with information of the other. Such information may include, for example, identification information and network address information, thus enabling communications between the user equipment 100 and the mobile robot 400 via the network.

The wireless router 300 is deployed in a position within a predetermined range of where the mobile robot 400 is to be deployed, and is connects to the network so that information may be transmitted from the user equipment 100 to the mobile robot 400 and information may be transmitted from the mobile robot 400 to the user equipment 100.

Here, the wireless router 300 is a network equipment which is connected to the Internet to enable a plurality of software devices to share one Internet line for simultaneous access to the Internet through transmission of wireless signals. The wireless router 300 also serves as an access point to perform wireless communication within a wireless coverage area of a predetermined range to connect the mobile robot 400 to the network.

The mobile robot 400 connects to the user equipment 100 through the network and operates according to user commands provided by the user equipment 100 while providing various kinds of information to the user equipment 100.

In this case, the mobile robot 400 may be exemplified as a cleaning robot, a hospital service robot, a logistics service robot, a military robot, or an industrial robot, and the type of robot is not specifically limited. However, in the following exemplary embodiment, the representative example of a cleaning robot will be mainly described.

Further, the wireless communication includes methods such as a wireless LAN (WLAN), Wi-Fi, WiBro (wireless broadband), WiMAX (World Interoperability for Microwave Access), High Speed Downlink Packet Access (HSDPA), Bluetooth, radio frequency identification (RFID), infrared data association (IrDA), ultra-wideband (UWB), Zigbee, 3rd generation (3G), 3rd Generation Partnership Project (3GPP), and Long Term Evolution (LTE).

Figure 2:
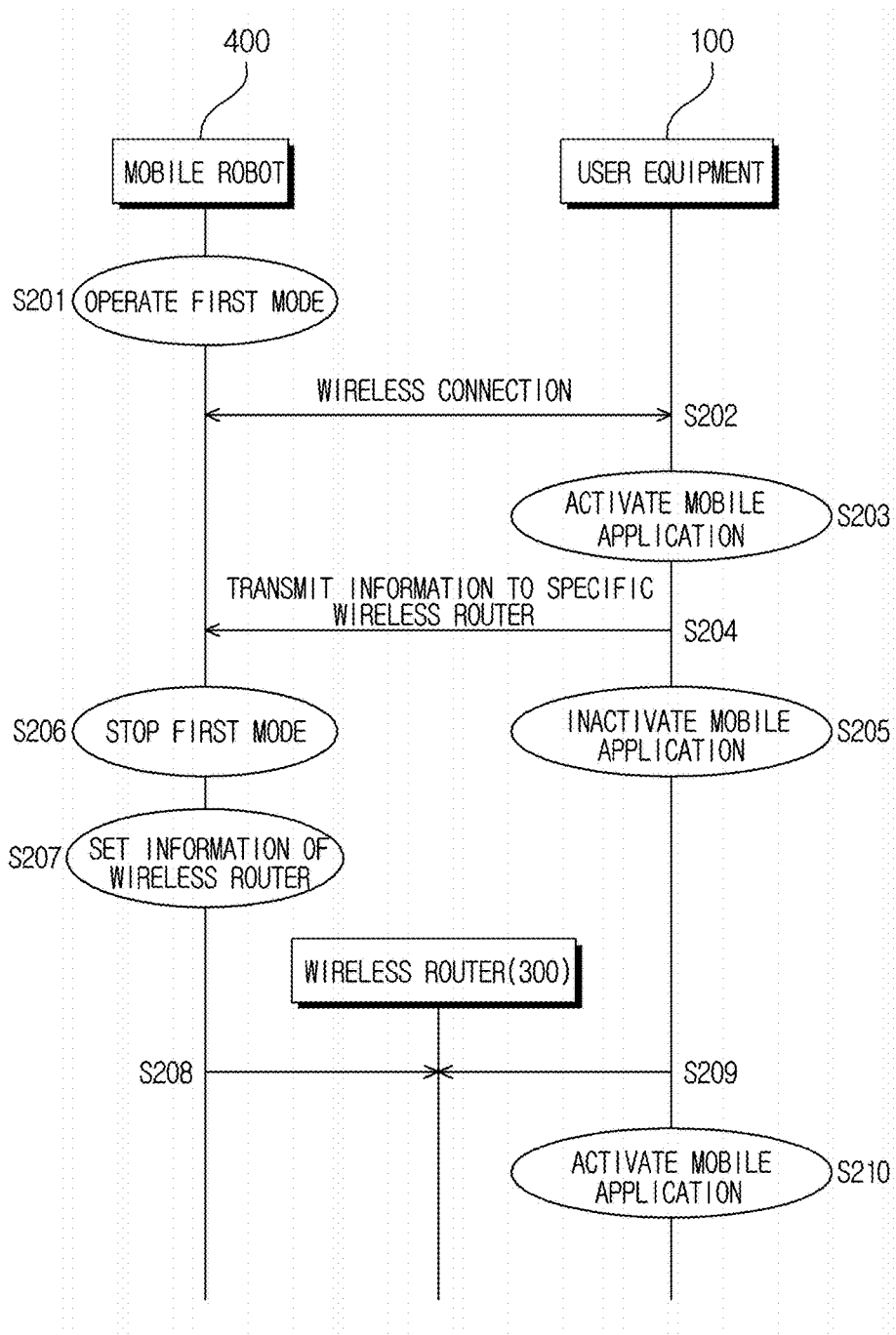
FIG. 2 is a view illustrating a network setup process, according to an exemplary embodiment of the present invention.

FIG. 2 is a view illustrating a network setup process, according to an exemplary embodiment of the present invention.

As illustrated in FIG. 2, when the mobile robot 400 is setup to serve as a wireless router, that is, to operate in the first mode (S201), the user equipment 100 may directly connect wirelessly to the mobile robot 400 (S202).

In this case, the mobile robot 400 has a network adaptor for connecting to the network. The network adaptor may be operated in the first mode to perform the function of a wireless router, that is, to perform as a soft-AP (software enabled access point) or in an infrastructure mode, or may be operated in a second mode connection to the wireless router 300, that is, in a client mode.

Next, the user equipment 100 may activate a mobile application (S203).

Next, the user equipment 100 may transmit to the mobile robot 400 information regarding a specific wireless router (e.g., wireless router 300) to which the mobile robot is to be connected through the activated mobile application, that is, information such as a service set identifier (SSID), a security protocol, a security algorithm, or a security key (S204).

Next, the user equipment 100 may inactivate the mobile application (S205).

Next, when information for a specific wireless router is received, the mobile robot 400 stops serving as a wireless router (S206) and sets the received information (S207) so that it may connect to a specific wireless router (S208).

In this case, after the user equipment 100 connects wirelessly to the wireless router (S209), the user equipment activates the mobile application and a user may control the mobile robot through the activated mobile application (S210).

In this case, the user equipment 100 and the mobile robot 400 may need to exchange a large quantity of information, such as voice information or image information, in real time. In the exemplary embodiment of the present invention, the user equipment 100 and the mobile robot 400 may exchange such information through, for example, the mediation server 200 or a peer-to-peer connection.

Here, an example of the case in which a peer-to-peer connection is applied between the user equipment and the mobile robot will be described.

Figure 3:
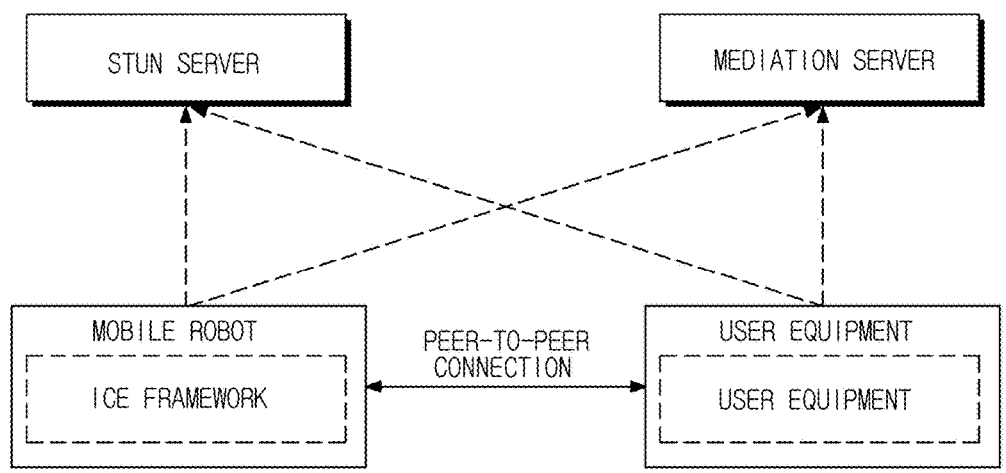
FIG. 3 is a view illustrating a peer-to-peer connection structure, according to an exemplary embodiment of the present invention.

FIG. 3 is a view illustrating a peer-to-peer connection structure, according to an exemplary embodiment of the present invention.

As illustrated in FIG. 3, the user equipment 100 and the mobile robot 400 each obtain identification information and network address information of the other from the mediation server 200 to establish a peer-to-peer connection.

In this case, the user equipment 100 and the mobile robot 400 are both equipped with an interactive connectivity establishment (ICE) framework, which performs connection and communication through two ICE protocols.

Further, in order to establish the peer-to-peer connection, a Session Traversal Utilities for NAT (STUN) server for obtaining information regarding the network address information may be provided in addition to the mediation server 200.

As described above, when the peer-to-peer connection is established between the user equipment 100 and the mobile robot 400, information, such as voice information, image information, and control information, may be exchanged therebetween. This exchange of information will be described hereafter.

Figure 4A:
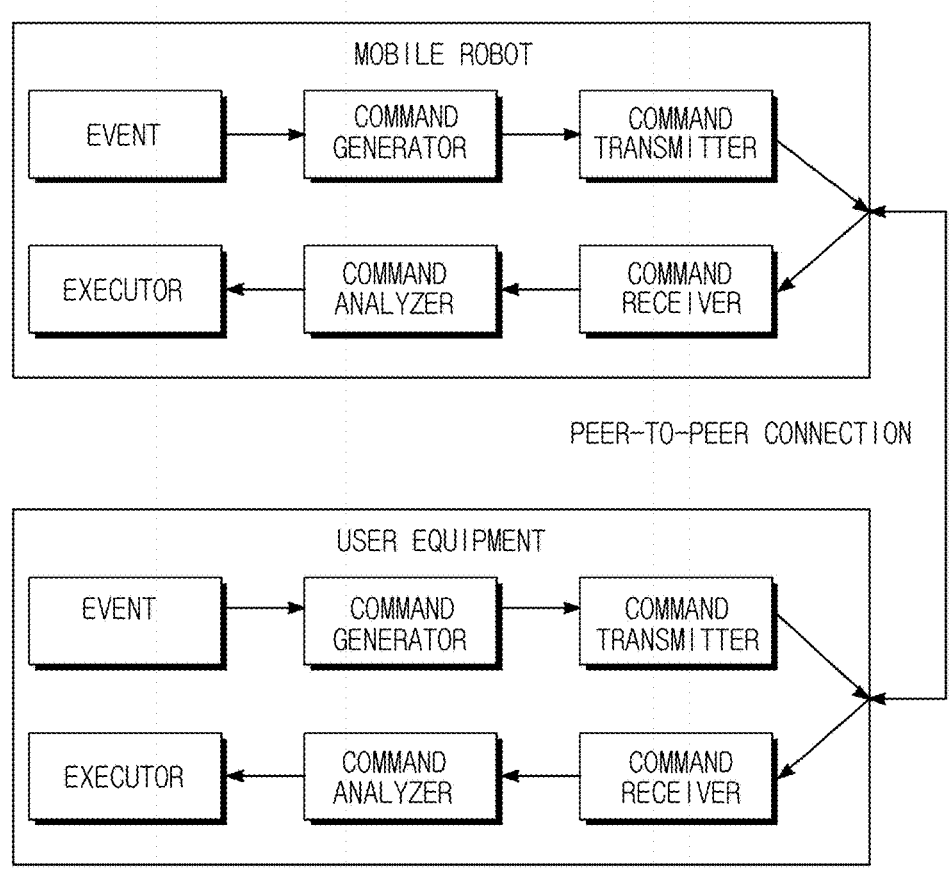
FIGS. 4A and 4B are views for explaining an information exchange principle, according to an exemplary embodiment of the present invention.
Figure 4B:
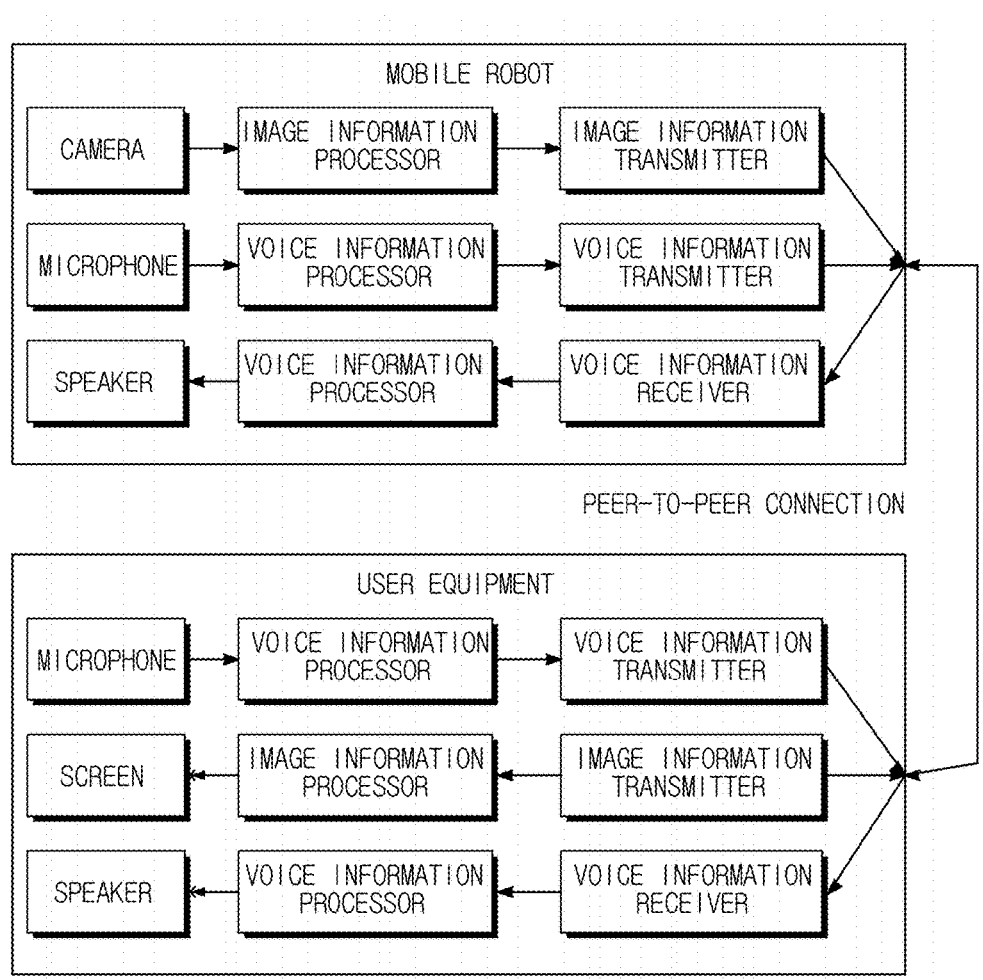

FIGS. 4A and 4B are views for explaining an exchange of information between the use equipment 100 and the mobile robot 400 according to an exemplary embodiment of the present invention.

As illustrated in FIG. 4A, when control information is exchanged, if an event is generated through input of the user of the user equipment 100, the mobile robot 400 generates a command corresponding to the event and transmits the generated command to the user equipment 100 in the form of network packets through the peer-to-peer connection.

The user equipment 100 receives the command from the mobile robot 400 through the peer-to-peer connection and interprets the received command to perform an appropriate operation corresponding to the command As illustrated in FIG. 4B, when a user of the user equipment 100 checks on an image or voice in the vicinity of the location of the mobile robot 400, or when another user is present in the location of the mobile robot 400, a voice call or video call may be performed.

For example, when voice information and image information are exchanged, the mobile robot 400 processes the image information input through its camera and voice information input through its microphone and transmits the information to the user equipment 100 through the peer-to-peer connection.

The user equipment 100 receives the voice information and the image information from the mobile robot 400 and reversely processes the received voice and image information to regenerate said information through an image output device (e.g., a display) and a voice output device (e.g., speaker).

Figure 5:
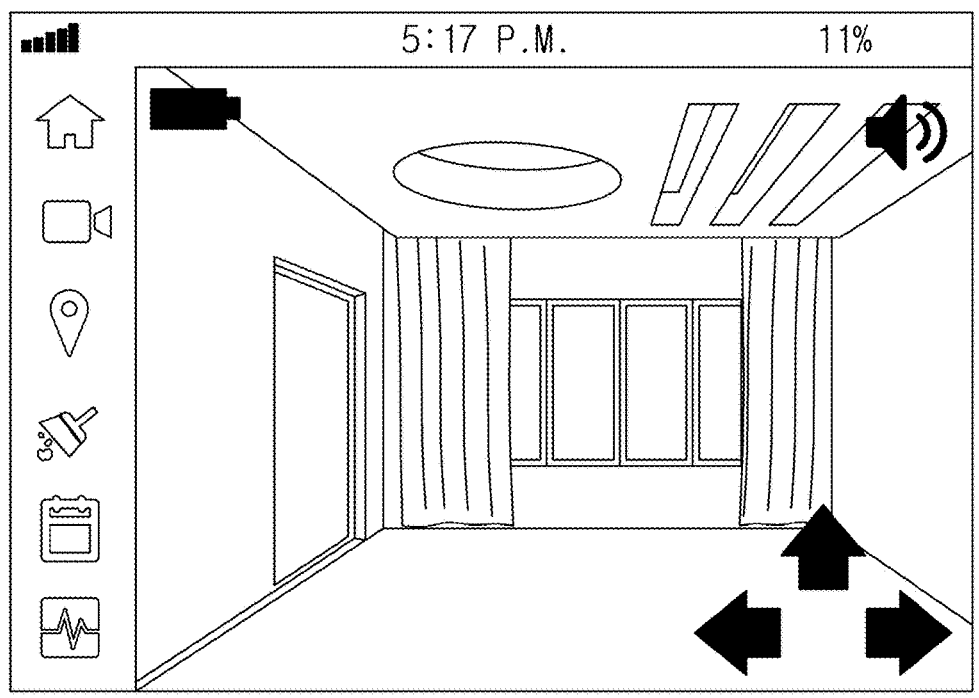
FIG. 5 is a view for explaining a driving/cleaning control function, according to an exemplary embodiment of the present invention.

FIG. 5 is a diagram for explaining a driving/cleaning control function, according to an exemplary embodiment of the present invention.

In FIG. 5, a mobile application screen for controlling the mobile robot 400 using the user equipment 100 is illustrated. The movement direction and driving request may be determined using the three buttons in the lower right portion of the screen.

For example, when the user presses one of the buttons, the user equipment 100 transmits, to the mobile robot 400 via the network, a command for the mobile robot 400 to start traveling in the direction corresponding to the pressed button. The mobile robot 400 interprets the received command and starts traveling in the applicable direction.

When the user releases the pressed button, the user equipment transmits a command for the mobile robot 400 to stop. The mobile robot 400 interprets the command and stops traveling.

Further, the user may select a cleaning mode through a menu or button. The cleaning mode may include, for example, an automatic mode in which the cleaning is performed automatically, a spot mode in which the cleaning is concentrated in a certain are areas, a turbo mode in which the cleaning suction force of the mobile robot 400 is strong, and a silent mode in which the cleaning suction force of the mobile robot is weak.

Further, the user may issue other commands for controlling the mobile robot 400, such as to start cleaning command, a stop cleaning command, or a recharge the battery command, through the menu or buttons.

Figure 6A:
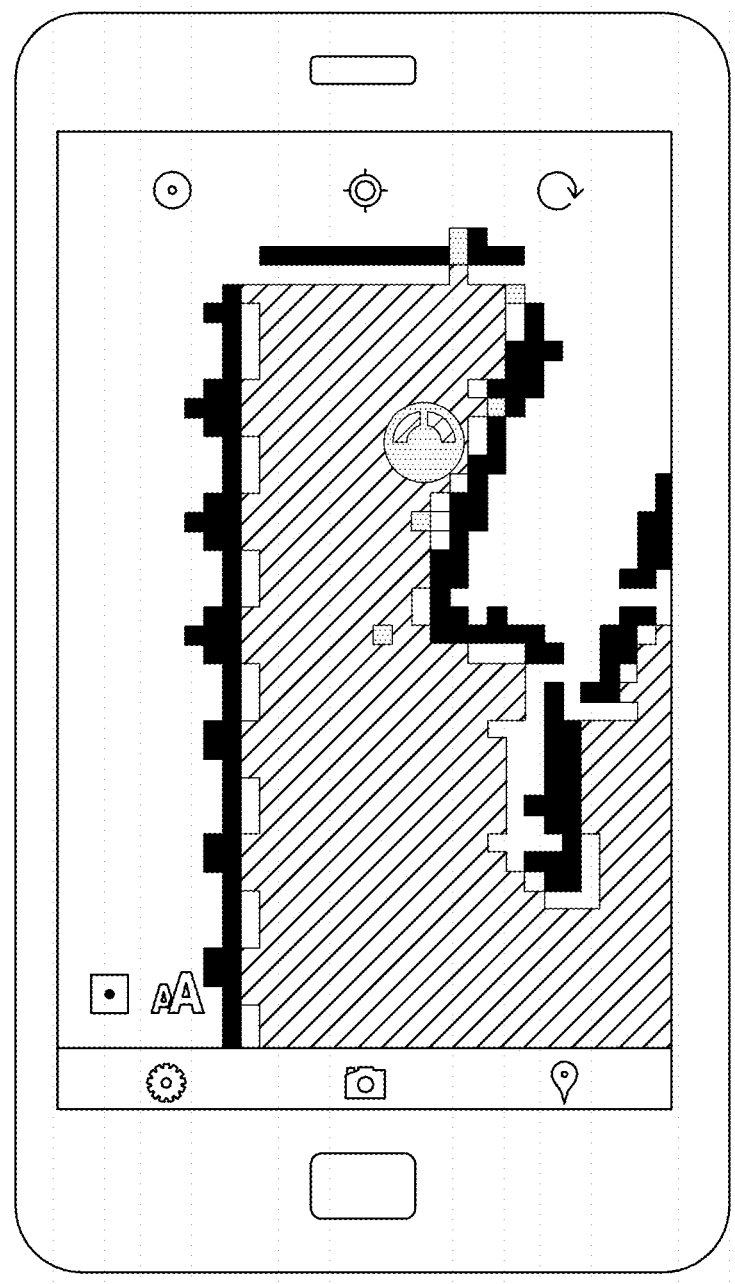
FIGS. 6A and 6B are views for explaining a map information checking function, according to an exemplary embodiment of the present invention.
Figure 6B:
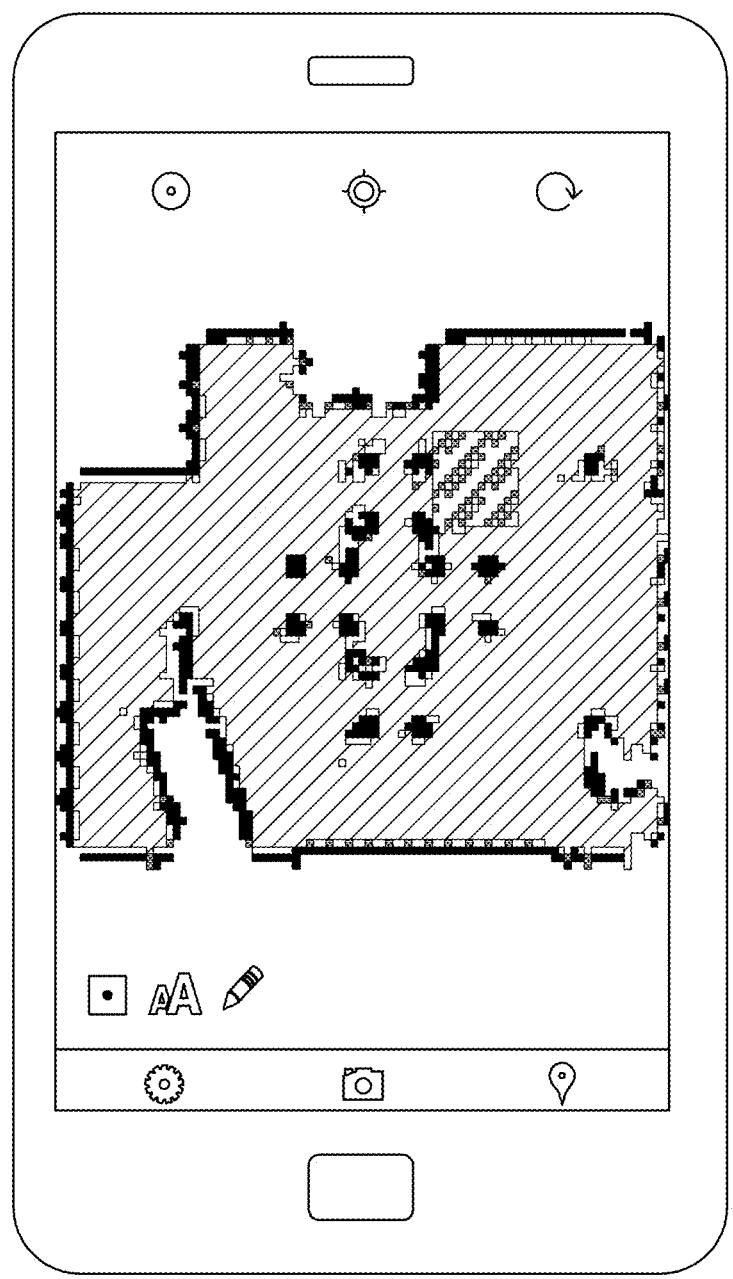

FIGS. 6A and 6B are views for explaining a map information checking function, according to an exemplary embodiment of the present invention.

As illustrated in FIGS. 6A and 6B, the mobile robot 400 may generate a map based on the SLAM technique with images obtained through its camera while it moves. In this case, information collected from one or more sensors, such as an ultrasound sensor, a floor sensing sensor, an infrared sensor, and a load current sensor, mounted on the mobile robot is may be used to generate a more accurate map.

Map information generated by the mobile robot 400 may be configured as an array of squares, and each square may include information for identifying the shape of the area corresponding to the square. The information for identifying the shape of the corresponding area may include additional information, such as already cleaned areas, obstacles around which the mobile robot 400 cannot be moved, areas where the floor was not detected such as a cliff, slippery areas, areas where the floor is carpeted, areas where there is a magnetic strip on the floor, and areas where the floor is covered in lots of dust.

The color of the square may vary depending on the information for identifying the shape of the area.

The mobile robot 400 transmits the map information formed by arrays of squares generated or updated during cleaning to the user equipment 100 so that the user equipment 100 may check the process of updating map information in real time, thus allowing the user equipment 100 to gain an understanding of the cleaning status through the information included in the map information.

In this case, the mobile robot 400 may transmit not only the previously completed map information, but also map information which is in the process of being generated, as illustrated in FIG. 6A, or map information which has been completely generated, as illustrated in FIG. 6B.

When the mobile robot 400 has completed cleaning once, it obtains map information for the entire area that was cleaned, and the obtained map information may be referred to when the area is to be cleaned again.

Figure 7A:
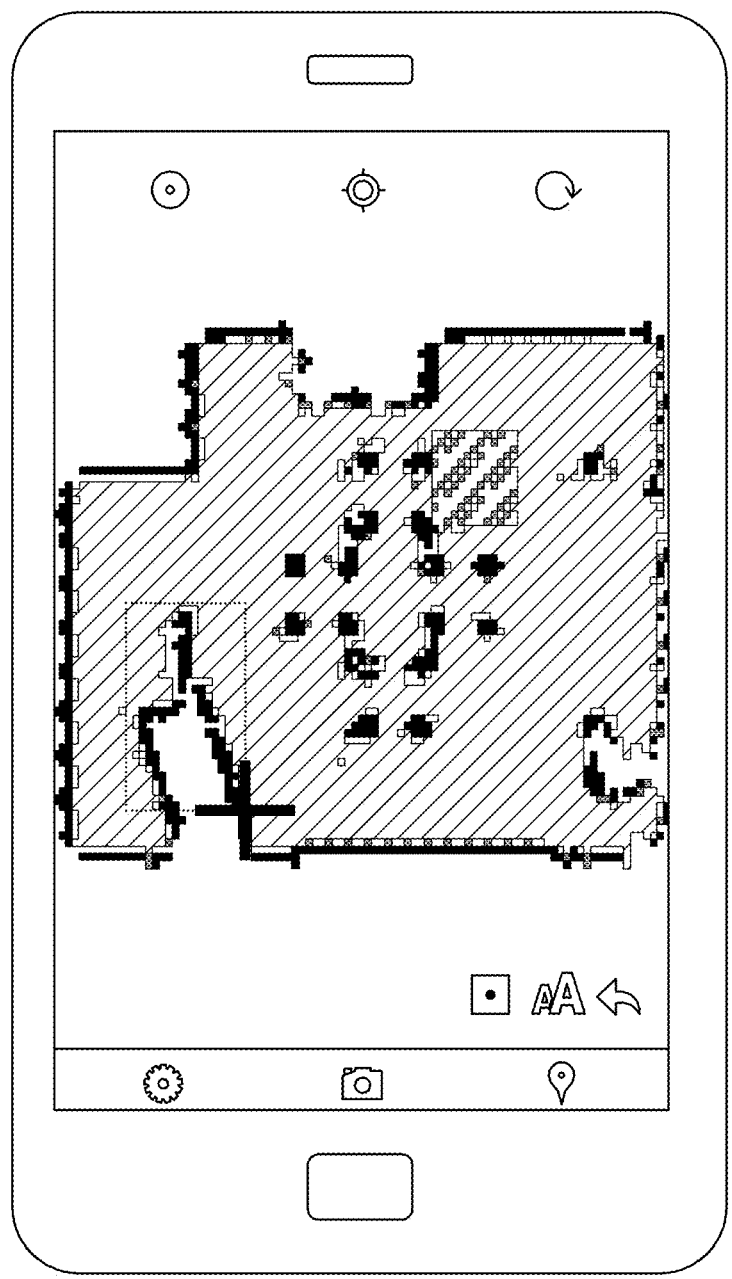
FIGS. 7A, 7B and 7C are views for explaining a cleaning area setting function, according to an exemplary embodiment of the present invention.
Figure 7B:
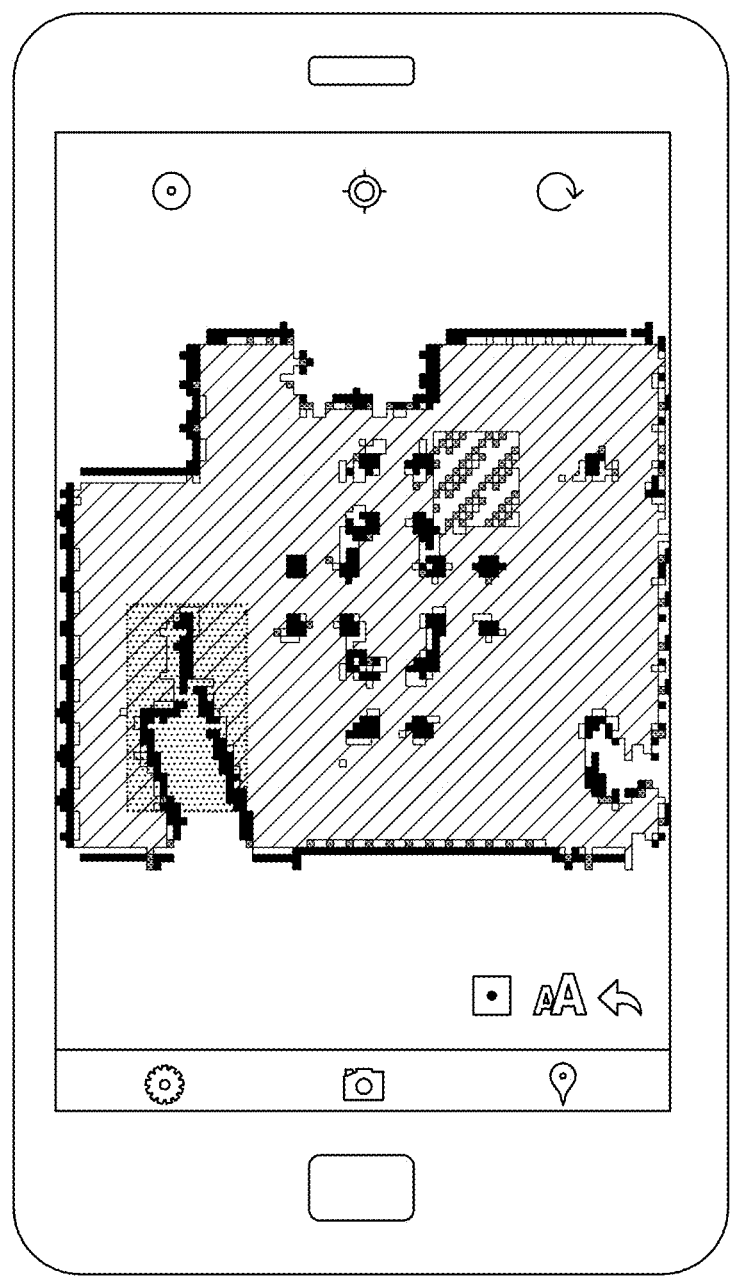
Figure 7C:
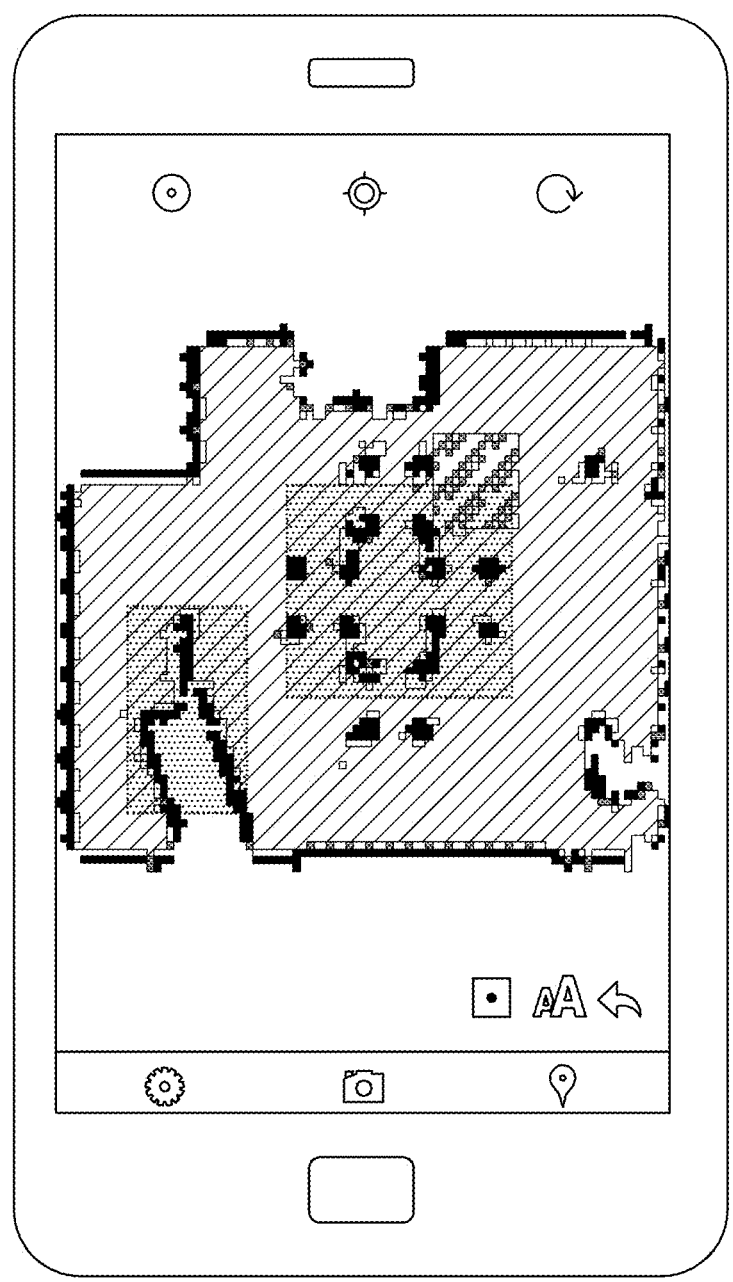

FIGS. 7A to 7C are views for explaining a cleaning area setup function, according to an exemplary embodiment of the present invention.

As illustrated in FIGS. 7A to 7C, when the user equipment 100 displays the map information on the screen, the user may set, within the displayed map information, areas in which entrance of the mobile robot 100 is prohibited as well as areas that may require intensive cleaning.

For example, the user may press a button on the display of the user equipment 100 to designate areas on the displayed map to which entrance of the mobile robot 400 is prohibited and areas that require intensive cleaning by touching the areas. As illustrated in FIG. 7A, when the user briefly presses and holds on an arbitrary vertex of a rectangular area to be designated, drags a finger to an opposite vertex of the rectangular area while holding the arbitrary vertex, and then releases the finger, the rectangular area is designated as the corresponding area, as illustrated in FIG. 7B.

Information on the prohibited areas and intensive cleaning areas setup as described above is represented by rectangular areas on the map, and may be configured by the coordinates of the left upper portion and the right lower portion of the rectangle.

As another example, when the user briefly presses and holds the predetermined areas where entrance is prohibited or intensive cleaning areas after pressing the button for designating the prohibited areas and intensive cleaning areas on the map screen of the user equipment 100, a message pops up asking whether to delete the settings, and the user may delete the area setup through response to the message.

A plurality of areas where entrance is prohibited and intensive cleaning areas may be set as necessary, as illustrated in FIG. 7C.

Figure 8A:
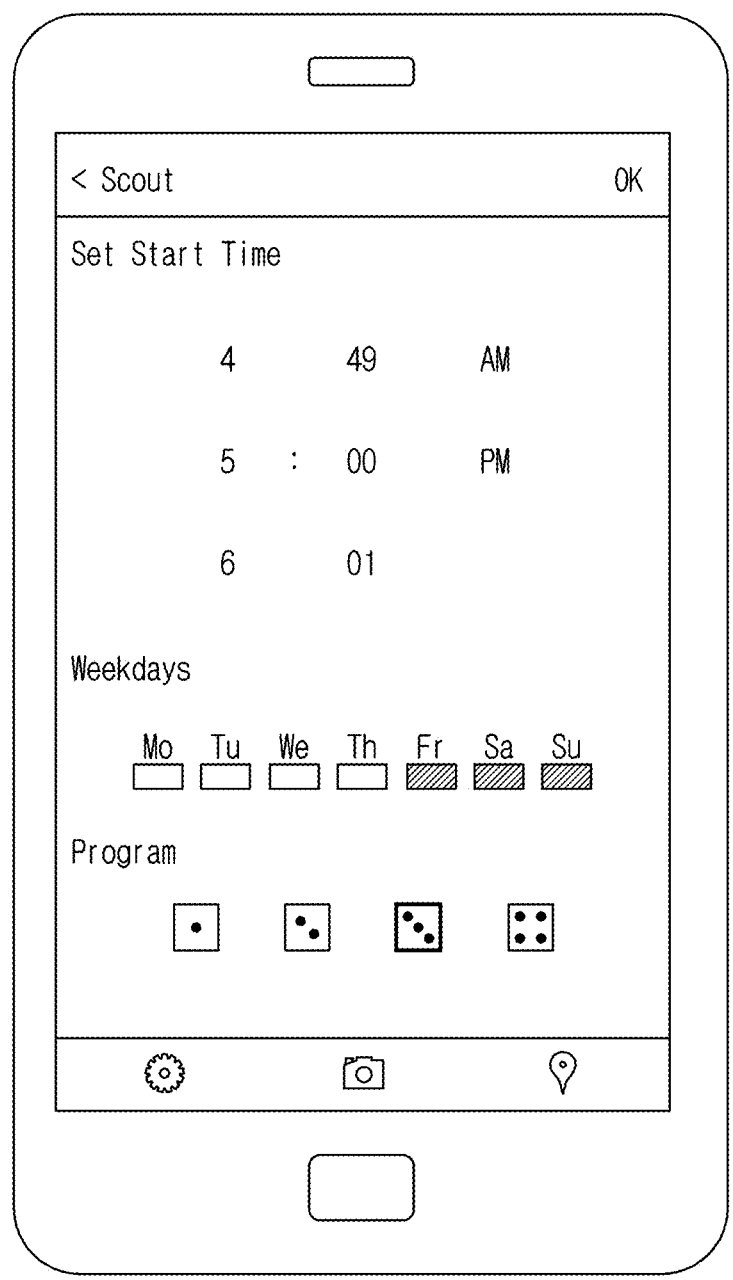
FIGS. 8A and 8B are views for explaining a cleaning schedule setting function, according to an exemplary embodiment of the present invention.
Figure 8B:
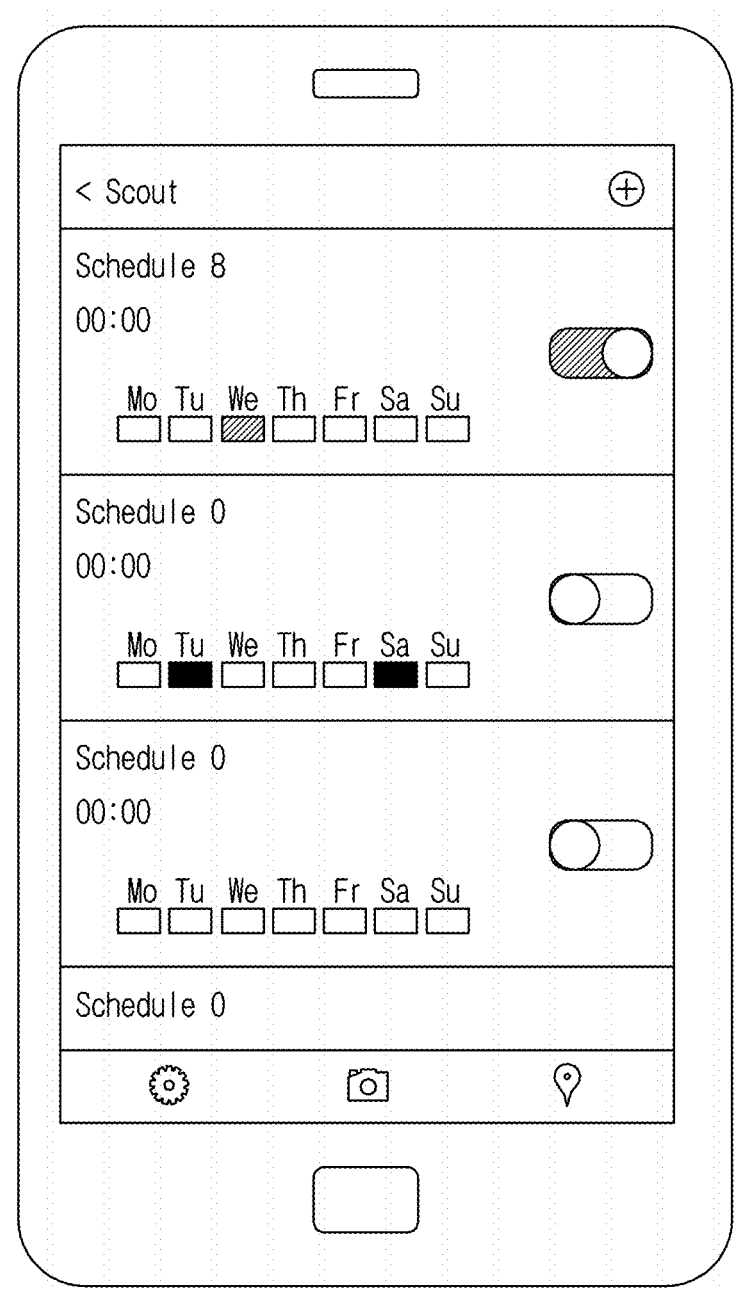

FIGS. 8A and 8B are views for explaining a cleaning schedule setup function, according to an exemplary embodiment of the present invention.

As illustrated in FIGS. 8A and 8B, the mobile robot may perform cleaning at a scheduled time set by the user in addition to cleaning following cleaning instruction signals directly issued by the user.

As illustrated in FIG. 8A, the user may set the time to start cleaning or the days of the week on which to perform cleaning on the screen for setting up the cleaning schedule, and a plurality of schedules may be reserved, as illustrated in FIG. 8B.

When the cleaning schedule is reserved, the user equipment 100 transmits a command corresponding to the reserved cleaning schedule to the mobile robot 400 and the mobile robot 400 stores the cleaning schedule and performs cleaning at the corresponding time on the corresponding day(s) of the week.

In this case, the mobile robot 400 performs the cleaning using the stored map; however, generally, when the mobile robot 400 moves to a new place to perform cleaning, the mobile robot 400 creates a new map to perform the cleaning. Therefore, according to the exemplary embodiment of the present invention, rather than generating only one map, a plurality of different maps may be generated according to the working environment, to be used selectively.

Figure 9A:
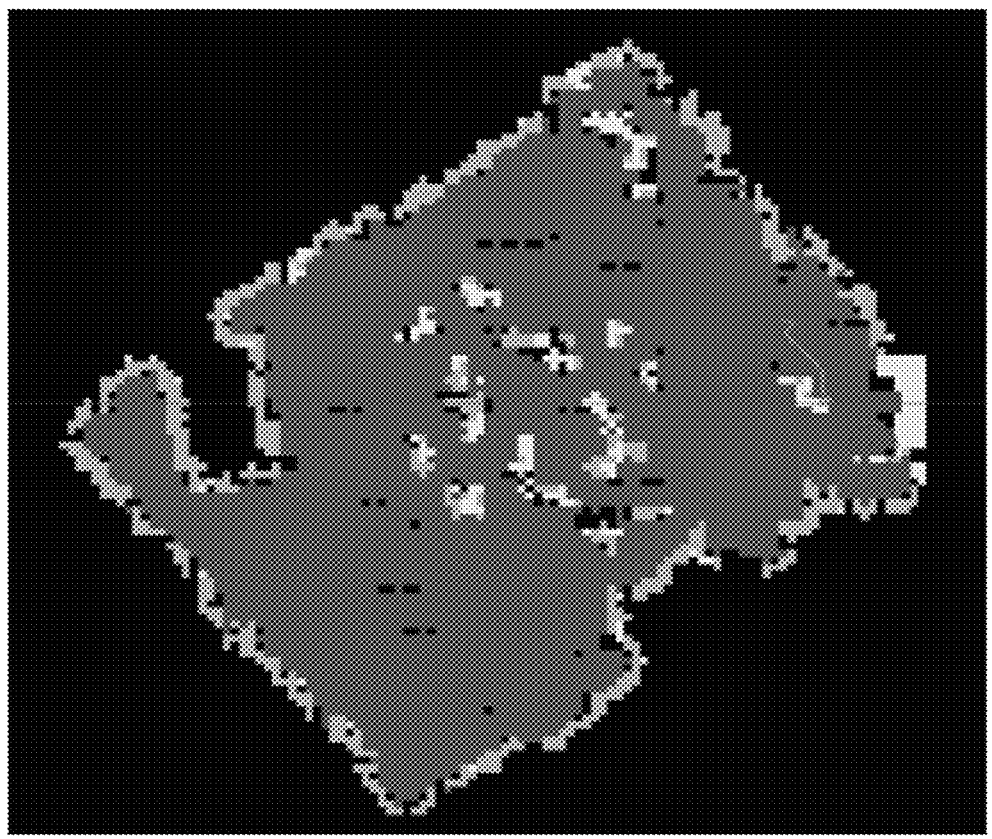
FIGS. 9A and 9B are views for explaining composites of cleaning area information, according to an exemplary embodiment of the present invention.
Figure 9B:

FIGS. 9A and 9B are views for explaining the composites of cleaning area information, according to an exemplary embodiment of the present invention.

As illustrated in FIGS. 9A and 9B, a plurality of maps are generated in the exemplary embodiment of the present invention. Specifically, a plurality of composites of cleaning area information may be generated, a cleaning area map representing the available cleaning area, as illustrated in FIG. 9A, a feature point map including feature point information for recognizing the position within the cleaning area, as illustrated in FIG. 9B, and option information set by a user.

One composite of cleaning area information may include the cleaning area map, the feature point map, or the option information.

The cleaning area map may be constituted by an array of squares for the target cleaning area. Each square may include information for identifying the shape of the corresponding region.

For example, the cleaning area map stores information such as areas where the cleaning has been completed, information on obstacles, and information on the recharging station.

The feature point map is a map of feature point information for recognizing the position of the mobile robot 400 in the cleaning area. The feature point information may include the coordinates of a feature point extracted from an image taken by a camera, for example. Such feature point information is generated for every square constituting the cleaning area map, and a plurality of feature point information may be generated.

The option information is information configured by the user, and for example, may include cleaning area information indicating areas for which entrance is prohibited and intensive cleaning areas, and cleaning manner information indicating a movement pattern, a movement speed, and an order of cleaning.

Such a plurality of composites of cleaning area information may be generated for the same location, and a plurality of such information may also be generated for different locations. For example, composites of cleaning area information may be generated for each of the case in which the door of a room is closed and the case in which the door is not closed, in the same location. Further, in the case of a duplex environment, composites of cleaning area information may be generated for every floor.

The cleaning area information may be map information that is created by the mobile robot 400, but is not limited thereto, and may also be map information provided through the user equipment 100.

Figure 10:
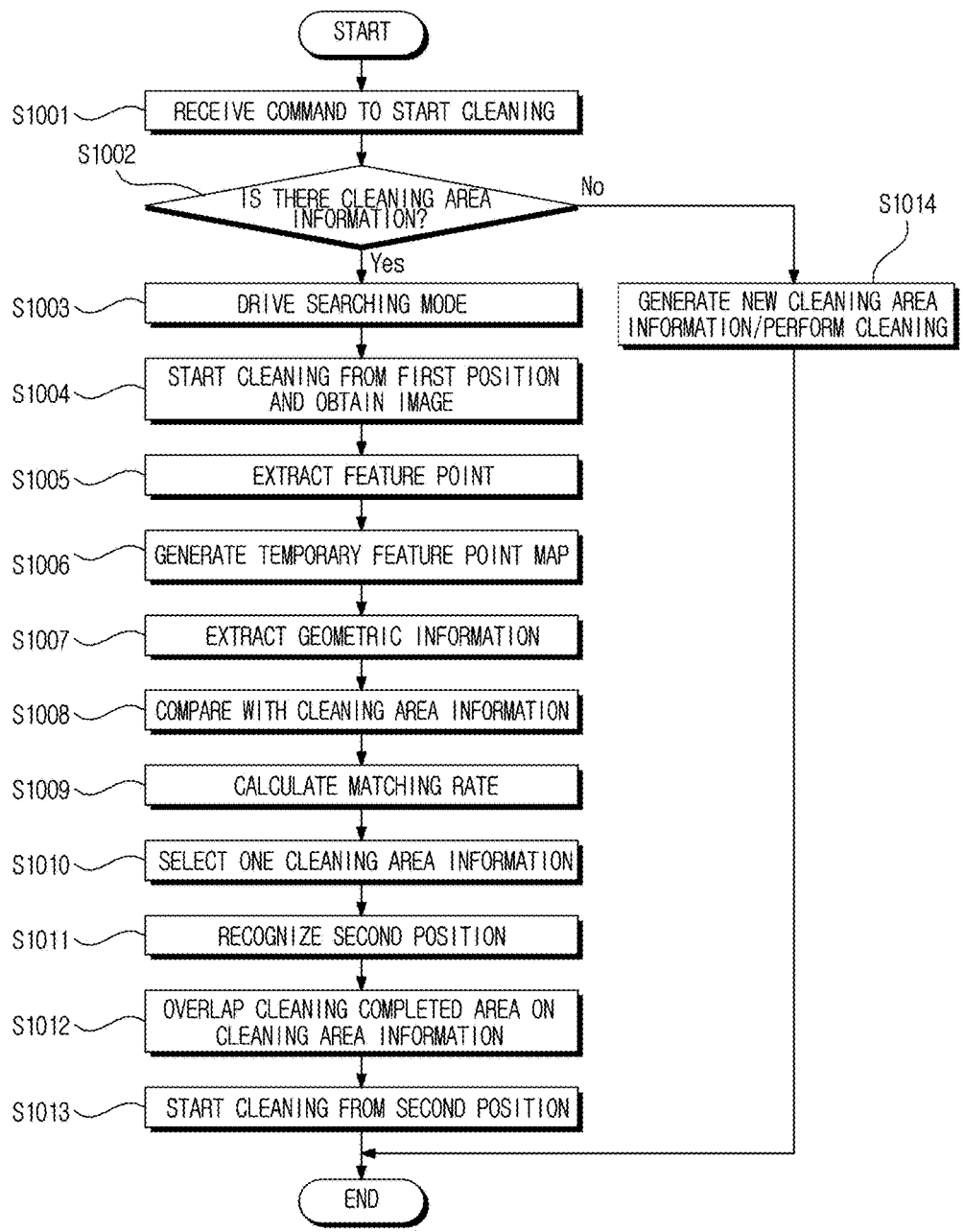
FIG. 10 is a view illustrating a method of performing cleaning, according to an exemplary embodiment of the present invention.

FIG. 10 is a view illustrating a method of performing cleaning, according to an exemplary embodiment of the present invention.

As illustrated in FIG. 10, when a mobile robot, according to an exemplary embodiment of the present invention, receives a control command, for example, a cleaning starting command from a user or user equipment (S1001), the mobile robot may check whether previously stored cleaning area information exists (S1002).

Next, when the cleaning area information exists, the mobile robot drives in a searching mode to determine its position before starting the cleaning (S1003), and may obtain an image by moving in accordance with a predetermined method while performing cleaning starting from a first position according to the searching mode (S1004).

To be more specific, the driving environment of the mobile robot, such as an indoor environment, may include various structures, and the structures may be formed by repeated patterns. In the case where the driving environment is formed from a repeated simple structure, it is difficult to accurately estimate the current position of the mobile robot only through the information obtained by the mobile robot in its place before starting the cleaning. Therefore, according to the exemplary embodiment of the present invention, information may be obtained through various methods.

For example, according to a first method, the mobile robot obtains an image from a camera while rotating in its place. Information extracted from the image obtained through the first method may have a higher matching rate with the map information than information obtained when the robot is stationary. However, the matching rate in indoor environments which have a simple repeated structure may still be low.

According to a second method, the mobile robot obtains an image from the camera during the process of driving forward in a straight line after rotating in place, and according to a third method, the first method and the second method may be combined, and the mobile robot moves based on an actually used traveling pattern.

In this case, the mobile robot operates by a movement pattern which is the same as in the case when cleaning is actually performed, but operates at a lower speed than its actual movement speed in order to increase the success rate of position recognition.

In contrast, when no cleaning area information exists, the mobile robot generates new composites of cleaning area information and may perform cleaning based on the newly generated composites of cleaning area information (S1014).

Next, the mobile robot extracts feature points from the obtained image (S1005) and may generate a temporary feature point map consisting of the extracted feature points (S1006).

In this case, the feature points are mainly extracted from corners, room corners, or the edges of objects.

Next, the mobile robot may extract geometric information from among the feature points which constitute the generated temporary feature point map, for example, the geometric shape and geometric correlation (S1007).

Next, the mobile robot compares the extracted geometric information with previously stored cleaning area information (S1008) to calculate the matching rate, indicating the degree of matching, as a result of the comparison (S1009).

Next, the mobile robot may select one composite of cleaning area information having the highest calculated matching rate (S1010). That is, the mobile robot may determine that the area where the cleaning area information with the highest matching rate is generated is the cleaning area wherein the mobile robot is currently located and is the target cleaning area.

In this case, the matching rate may be calculated using a sum of absolute differences (SAD) or a sum of squared differences (SSD), but is not limited thereto, and various other methods may also be used.

Next, the mobile robot loads the selected composite of cleaning area information and compares the feature point map constituting the loaded cleaning area information with the temporary feature point map to recognize a current second position (S1011).

That is, the mobile robot recognizes a position on the feature point map which corresponds to the temporary feature point map from among the feature point maps which constitute the loaded composite of cleaning area information as the current second position.

In this case, the mobile robot does not compare the temporary feature point map with all the feature point maps which constitute the loaded composites of cleaning area information, but predicts a movement point using odometry information and compares feature point maps located in the vicinity of the predicted movement point.

To this end, the mobile robot collects inertia information while operating in searching mode and calculates odometry information, that is, the traveling distance and traveling direction, based on the collected inertia information.

Figure 11:
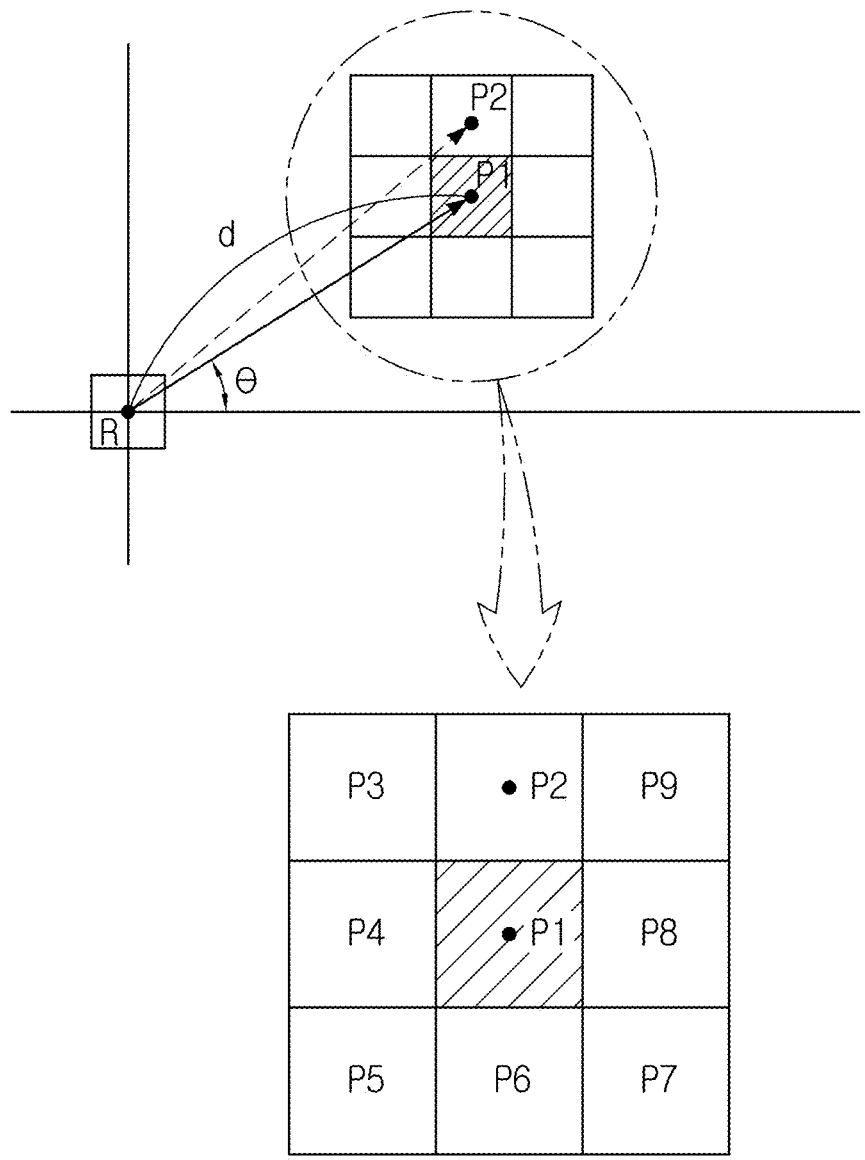
FIG. 11 is a view for explaining a position recognition process, according to an exemplary embodiment of the present invention.

FIG. 11 is a view for explaining the position recognition process, according to an exemplary embodiment of the present invention.

As illustrated in FIG. 11, when the mobile robot operates in a predetermined manner while performing cleaning from a first position, R, in accordance with the searching mode to obtain an image, a movement point, P1, may be predicted using odometry information, that is, the traveling distance, d, and traveling direction, θ.

In this case, the mobile robot may compare temporary feature point information at a predicted movement point, $P_1$, with feature point information from the feature point maps which constitute the actual composite of cleaning area information of said movement point $P_1$ and $P_2$, $P_3$, $P_4$, $P_5$, $P_6$, $P_7$, $P_8$, and $P_9$ in the vicinity thereof, to determine the position $P_2$ found to have the highest matching rate as the second position.

Next, the mobile robot may overlap the areas where cleaning has been completed in the process of recognizing the second position onto the composite of cleaning area information (S1012). That is, the mobile robot may update the composite of cleaning area information to include the areas where cleaning was completed during the process of recognizing its position while following the searching mode.

As described above, because the mobile robot may check the area where cleaning has already been completed during the position recognition process, the cleaning time may be shortened and the cleaning efficiency may be increased.

Next, the mobile robot may start cleaning from a second position within the composite of cleaning area information (S1013).

Figure 12:
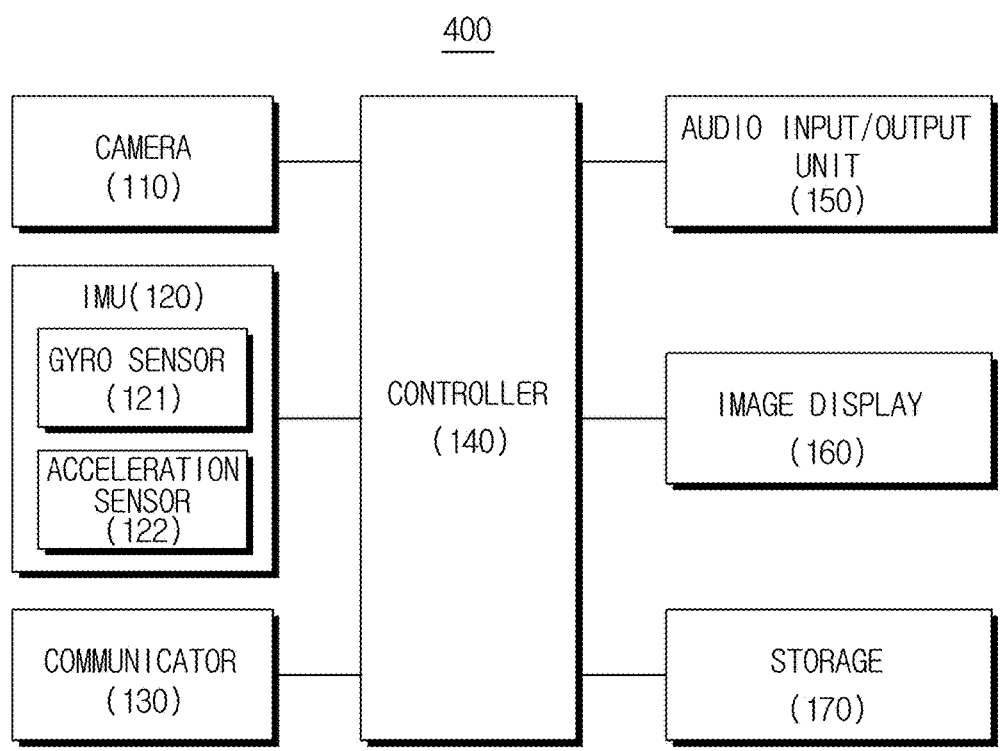
FIG. 12 is a block diagram of a mobile robot, according to an exemplary embodiment of the present invention.

FIG. 12 is a diagram illustrating the detailed configuration of a mobile robot, according to an exemplary embodiment of the present invention.

As illustrated in FIG. 12, a mobile robot 400, according to an exemplary embodiment of the present invention, may include an image obtaining unit 110, an IMU 120, a communicator 130, a controller 140, an audio input/output unit 150, an image display 160, and a memory 170.

The image obtaining unit 110 is, for example, a camera, and is mounted to capture images of a predetermined region of interest. Here, the region of interest may be an area that may be photographed using a camera mounted on the mobile robot.

The IMU 120 measures inertia information of the mobile robot, for example, information such as the position and/or pose. The IMU 120 may include, for example, a gyro sensor 121 and an acceleration sensor 122.

The gyro sensor 121 collects angular velocity information of the mobile robot 400.

The mobile robot 400 according to the exemplary embodiment of the present invention distinguishes the pose or operational status of the mobile robot 400 using three-dimensional angle information and is controlled using the distinguished pose or operation status, so that the gyro sensor 121 is preferably a triaxial sensor.

That is, the gyro sensor 121 may collect triaxial angular velocity information for an x-axis, a y-axis, and a z-axis.

The triaxial angular velocities of the x-axis, y-axis, and z-axis, which are detected by the triaxial gyro sensor 121, are referred to as the roll, pitch, and yaw, respectively.

Specifically, rotation around the x-axis of the mobile robot is called the roll, rotation around the y-axis of the mobile robot is called the pitch, and rotation around the z-axis of the mobile robot is called the yaw.

The three-dimensional angular velocity information to be obtained in the exemplary embodiment of the present invention refers to the roll, pitch, and yaw.

The acceleration sensor 122 measures the gravitational acceleration and acceleration in accordance with the movement of the mobile robot 400. The acceleration sensor 122 may be a triaxial sensor, similarly to the gyro sensor 121.

That is, the acceleration sensor 122 may collect the acceleration information of three axes, including an x-axis, a y-axis, and a z-axis.

The communicator 130 connects with the user equipment 100 to transmit and receive various kinds of information. For example, the communicator 130 may receive control commands from the user equipment 100 and transmit map information to the user equipment 100.

The controller 140 drives a driving motor and a suction motor based on previously stored composite cleaning area information following a cleaning start command to control the mobile robot 400 for the performance of cleaning while moving.

The controller 140 obtains odometry information, that is, the traveling distance and traveling direction, based on the inertia information provided by the IMU 120, predicts the movement point based on the obtained odometry information, and generates and updates the composite cleaning area information, which consists of a cleaning area map for the area to be cleaned based on the predicted movement point, a feature point map, and option information.

The controller 140 selects one composite of cleaning area information from among a plurality of composites of cleaning area information which is stored in advance and controls the mobile robot 400 to perform cleaning based on the selected composite of cleaning area information. In this case, the controller 140 operates in a searching mode for determining its position and obtains an image in accordance to the searching mode, extracts a feature point from the obtained image, generates a temporary feature point map based on the extracted feature point, and compares the generated temporary feature point map with feature point maps which constitute the plurality of previously stored composites of cleaning area information to select one composite of cleaning area information as a result of the comparison.

The controller 140 predicts the movement point in accordance to the movement and compares the feature point information for the predicted movement point with the selected feature point map which constitutes the composite of cleaning area information to recognize the current position, and controls the mobile robot to perform cleaning based on the recognized current position.

When cleaning is performed based on the composite cleaning area information, the controller 140 may generate a cleaning area which is different from the available cleaning area within the cleaning area map which constitutes the composite cleaning area information. Therefore, when the area where cleaning is completed on the cleaning area map which is newly generated after the completion of cleaning is larger than the available cleaning area within the original cleaning area map, the controller 140 may determine that the newly generated cleaning area map is more suitable for the user environment, and may store the newly generated cleaning area map and delete the existing cleaning area map.

When a control command is received from the user equipment 100, the controller 140 controls the mobile robot 400 according to the received control command. For example, the controller 140 controls the movement direction and the moving speed, and controls the mobile robot 400 to start or stop cleaning according to the control command for the driving/cleaning control function.

As another example, the controller 140 may provide a plurality of previously stored composites of cleaning area information to the user equipment 100 according to the control command for the map information checking function.

As yet another example, the controller 140 may transmit information such as the areas in the process of cleaning, areas cleaned during movement, or areas to be cleaned, according to the control command for the cleaning status checking function.

As still yet another example, the controller 140 may receive and output voice data or image data in accordance with the video call function, and transmit any input voice data or image data to the user equipment 100.

The audio input/output unit 150 may receive or output voice information. The audio input/output unit 150 may consist of a microphone, which receives voice information and a speaker which outputs voice information.

The image display 160 not only displays image information such as the cleaning area map on the screen, but may also display image information received from the user equipment 100 in accordance with the video call function.

The memory 170 may store a plurality of composites of cleaning area information, which are generated to have various forms according to the operation environment. The memory 170 may store the cleaning area map, the feature point map, and the option information, which constitute the cleaning area information as one file or as a plurality of files which are connected to each other.

The mobile robot 400 may include various sensors, for example, an obstacle sensing sensor and/or a floor sensing sensor. The obstacle sensing sensor may be provided as a contact type sensor or a non-contact type sensor depending on whether the sensor is to contact with the obstacle, or as a hybrid of the contact and non-contact type sensors.

The contact type sensor refers to a sensor that senses obstacles when the mobile robot actually collides with the obstacle.

The non-contact type sensor refers to a sensor that senses an obstacle in advance before colliding with the obstacle or without colliding with the obstacle and, for example, may include an ultrasound sensor, a photo sensor, or an RF sensor.

Even though all components of the exemplary embodiment may be combined as one component or their operations may be combined, the present invention is not limited to the exemplary embodiment. In other words, one or more of all of the components may be selectively combined to be operated within the scope of the purpose of the present invention. Further, all of the components may be implemented as one independent hardware, but a part or all of the components may be selectively combined to be implemented as a computer program which includes a program module which performs a part or all of functions combined in one or plural hardwares. Further, such a computer program may be stored in a computer readable media such as a USB memory drive, CD disk, or a flash memory to be read and executed by a computer for implementation of the exemplary embodiment of the present invention. The memory media of the computer program may include media such as a magnetic recording medium or an optical recording medium.

The exemplary embodiments of the present invention which have been described above are examples, and it is obvious to those skilled in the art that various changes or modifications may be made without departing from the spirit and scope of the present invention. Therefore, the exemplary embodiments of the present invention are provided for illustrative purposes only, and are not intended to limit the technical spirit of the present invention. The scope of the technical spirit of the present invention is not limited thereto. The protective scope of the present invention should be construed based on the following claims, and all the technical concepts in the equivalent scope thereof should be construed as falling within the scope of the present invention.

What is claimed is:

1. A mobile robot comprising:
   a memory; and
   a controller,
   wherein the controller selects cleaning area information stored in the memory, recognizes a position of the mobile robot within a cleaning area, and causes the mobile robot to clean the cleaning area based on the selected cleaning area information and the recognized position using feature point maps including feature point information for the cleaning area,
   wherein the controller obtains images of the cleaning area while the mobile robot moves from a first position to a second position within the cleaning area, and extracts feature point information from the obtained images to configure a temporary feature point map,
   wherein the controller calculates odometry information using inertia information obtained during the movement of the mobile robot from the first position to the second position, and predicts a movement point based on the calculated odometry information,
   wherein the controller compares the temporary feature point map with feature point maps associated with the predicted movement point and a vicinity of the predicted movement point without comparing the temporary feature point map with all feature point maps which constitute a loaded composite of cleaning area information, and
   wherein the controller determines, based on the comparison of the temporary feature point map with the feature point maps associated with the predicted movement point and a vicinity of the predicted movement point, a position having a highest matching rate as the second position.

2. The mobile robot of claim 1, wherein the cleaning area information includes information obtained from a cleaning area map representing the cleaning area, the feature point map, and option information provided by a user of the mobile robot, and wherein the controller selects at least a portion of each of the information obtained from the cleaning area map, the cleaning area map, and the option information.

3. The mobile robot of claim 2, wherein when the second position is determined, the controller updates the cleaning area map which configures the cleaning area information by an area where the cleaning is completed from the first position to the second position, and controls the mobile robot to perform cleaning of the cleaning available area from the second position in the updated cleaning area map and update the performed result.

4. The mobile robot of claim 2, wherein the controller extracts predetermined geometric information from the configured temporary information map and compares the temporary feature point map with the feature point map which configures the plurality of stored cleaning area information based on the extracted geometric information to select cleaning area information configured by a feature point map having the highest matching rate.

5. The mobile robot of claim 1, wherein when information on a wireless router is received from user equipment, the controller wirelessly connects the mobile robot to the wireless router based on the received information.

6. The mobile robot of claim 1, wherein the controller operates a first mode for serving as a wireless router which is wirelessly connected to user equipment, when the information on the wireless router is received from the user equipment, stops the first mode, and when the first mode stops, operates a second mode for connecting the user equipment to the wireless router based on the received information on the wireless router.

7. A mobile robot system, the system comprising:
   a mobile robot; and
   a mobile application for use with a user equipment to cause the user equipment to transmit a control command to the mobile robot through a wireless router and receive information on an area where cleaning is completed and cleaning area information while the mobile robot performs cleaning based on previously stored cleaning area information, wherein the mobile robot obtains images of the cleaning area while the mobile robot moves from a first position to a second position within the cleaning area, and extracts feature point information from the obtained images to determine a temporary feature point map, wherein the mobile robot calculates odometry information using inertia information obtained during the movement of the mobile robot from the first position to the second position, and predicts a movement point based on the calculated odometry information, wherein the mobile robot compares the temporary feature point map with feature point maps associated with the predicted movement point and a vicinity of the predicted movement point without comparing the temporary feature point map with all feature point maps which constitute a loaded composite of cleaning area information, wherein the controller determines, based on the comparison of the temporary feature point map with the feature point maps associated with the predicted movement point and a vicinity of the predicted movement point, a position having a highest matching rate as the second position, and wherein the mobile application receives cleaning area information including the second position.

8. The system of claim 7, wherein the user equipment activates the mobile application.

9. The system of claim 7, wherein the user equipment transmits the control command to the mobile robot in response to the previously stored cleaning area information.

10. A method performed by a mobile robot, the method comprising:
  selecting one cleaning area information among a plurality of previously stored cleaning area information according to a control command;
  recognizing a position on a cleaning area map which configures the selected cleaning area information; and
  updating the cleaning area map by an area where the cleaning is completed as a result of performing cleaning on a cleaning available area in the cleaning area map from the recognized position using feature point maps including feature point information for a cleaning area, wherein the selecting includes obtaining images of the cleaning area while the mobile robot moves from a first position to a second position within the cleaning area, and extracting feature point information from the obtained images to configure a temporary feature point map, wherein the recognizing includes calculating odometry information using inertia information obtained during the movement of the mobile robot from the first position to the second position, and predicting a movement point based on the calculated odometry information, wherein the recognizing includes the mobile robot comparing the temporary feature point map with feature point maps associated with the predicted movement point and a vicinity of the predicted movement point without comparing the temporary feature point map with all feature point maps which constitute a loaded composite of cleaning area information, and wherein the recognizing includes the mobile robot determining, based on the comparison of the temporary feature point map with the feature point maps associated with the predicted movement point and a vicinity of the predicted movement point, a position having a highest matching rate as the second position.

11. The method of claim 10, wherein in the updating, when the second position is determined, the cleaning area map which configures the cleaning area information is updated by an area where the cleaning is completed from the first position to the second position, and cleaning on the cleaning available area is performed from the second position in the updated cleaning area map and the performed result is updated.

* * * * *